United States Patent [19]

Kamada

[11] Patent Number: 4,871,885
[45] Date of Patent: Oct. 3, 1989

[54] COMBINED PUSH AND SLIDE SWITCH ASSEMBLY

[75] Inventor: Soetsu Kamada, Furukawa, Japan

[73] Assignee: Alps Electric Co., Ltd., Tokyo, Japan

[21] Appl. No.: 295,952

[22] Filed: Jan. 11, 1989

[30] Foreign Application Priority Data

Mar. 30, 1988 [JP] Japan .................................. 63-41073

[51] Int. Cl.[4] ...................... H01H 9/00; H01H 13/50; H01H 15/00
[52] U.S. Cl. .................................. 200/5 R; 200/16 R; 200/18; 200/537; 200/547
[58] Field of Search ................... 200/1 R, 4, 5 R, 5 A, 200/16 R, 16 A, 16 C, 16 D, 17 R, 18, 529, 533, 537, 542, 547–551, 573, 61.86; 340/825.44

[56] References Cited

U.S. PATENT DOCUMENTS

| | | | |
|---|---|---|---|
| 3,750,080 | 7/1973 | Rouvre et al. | 200/4 X |
| 3,784,765 | 1/1974 | Daly | 200/5 R |
| 4,115,670 | 9/1978 | Chandler | 200/16 R X |
| 4,249,165 | 2/1981 | Mori | 340/825.44 |
| 4,659,880 | 4/1987 | Kondo et al. | 200/5 R |

Primary Examiner—J. R. Scott
Attorney, Agent, or Firm—Guy W. Shoup; Paul J. Winters; Stephen L. Malaska

[57] ABSTRACT

The on-off operation of the switch as the slide switch is effected by moving the operating knob in the first horizontal direction, namely, the X-direction to move the slider A together with the slider B in the same direction and thereby sliding the first contactor in the X-direction on an associated pattern formed on a switch board. On the other hand, the on-off operation of the switch as the push switch is effected by pushing the operating knob in the second horizontal direction, namely, the Y-direction perpendicular to the X-direction to engage the cam M of the slider A with the engageable portion of the slider C and move the slider C in the Z-direction perpendicular to the Y-direction against the biasing force of the second spring, and thereby sliding the second contactor in the Z-direction on an associated pattern on the switch board.

4 Claims, 3 Drawing Sheets

COMBINED PUSH AND SLIDE SWITCH ASSEMBLY

BACKGROUND OF THE INVENTION

The present invention relates to a switch capable of functioning both as a push switch and a slide switch with a single operating knob. For example, the switch is employable for a slide switch for selecting an operating speed of a wiper of an automobile and a push switch for injecting a window washer liquid to be used with the wiper.

In a conventional switch capable of functioning both as the push switch and the slide switch, first and second contactors are provided on a lower surface and a side surface of a slider. The first contactor is slidable on a first switch board provided on the bottom of a case, and the second contactor is slidable on a second switch board perpendicular to the first switch board. When an operating knob fixed at an end of the slider is moved horizontally, the switch is operated as the slide switch, while when the operating knob is pushed, the switch is operated as the push switch.

In this structure, as the two switch boards are necessary, the structure is complicated. Further, as the first and second contactors must be normally pressed on the first and second switch boards, the operation feeling of the operating knob is deteriorated. In addition, there is a possibility that the first contactor will be deformed upon pushing of the operating knob.

In another conventional switch, a first contactor is slidable on a switch board provided on the bottom of a case by a horizontal movement of a slider to effect the function as the slide switch, while a second contactor provided on a lower surface of the slider is adapted to elastically press a pattern on the switch board by downwardly pushing the slider to effect the function as the push switch.

However, in the pushing operation of the slider, the second contactor does not carry out self-cleaning of the pattern on the switch board, causing a possibility of contact fault.

SUMMARY OF THE INVENTION

It is a first object of the present invention to provide a switch assembly which may function as both a slide switch and a push switch with a single operating knob.

It is a second object of the present invention to provide a switch assembly which may carry out self-cleaning of contacts to prevent contact fault.

It is a third object of the present invention to provide a switch assembly which may simplify the structure.

It is a fourth object of the present invention to provide a switch assembly which may provide an operation feeling of the operating knob.

According to the present invention, there is provided a combined push and slide switch assembly comprising a case; a slider A provided in said case and adapted to be slid in a first horizontal direction (X-direction) and a second horizontal direction (Y-direction) of said case, said slider A having a cam M at a rear end portion thereof; an operating knob fixed to a front end of said slider A projecting outside said case; a slider B provided in said case and loosely fitted to said slider A in such a manner as to permit the sliding movement of said slider A in said Y-direction but to be moved together with said slider A in said X-direction; a first contactor provided in said slider B for effecting an operation of a slide switch; a first spring interposed between said slider A and said slider B to normally bias said slider A toward said operating knob; a slider C provided in said case and adapted to be moved in a Z-direction perpendicular to both said X-direction and said Y-direction, said slider C having an engageable portion engageable with said cam M of said slider A; a second contactor provided in said slider C for effecting an operation of a push switch; and a second spring interposed between said slider C and said case for retaining said slider C to said case; wherein when said operating knob is moved in said X-direction to slide said slider A in the same direction, said slider B is a slide together with said slider A to slide said first contactor, thereby effecting the operation of said slide switch, while when said operating knob is pushed against a biasing force of said first spring to move said slider A in said Y-direction, said cam M of said slider A is brought into engagement with said engageable portion of said slider C against a biasing force of said second spring to move said slider C in said Z-direction and thereby to slide said second contactor in the same direction, thereby effecting the operation of said push switch.

With this arrangement, the on-off operation of the switch as the slide switch is effected by moving the operating knob in the first horizontal direction, namely, the X-direction to move the slider A together with the slider B in the same direction and thereby sliding the first contactor in the X-direction on an associated first fixed contact pattern formed on a switch board. On the other hand, the on-off operation of the switch as the push switch is effected by pushing the operating knob in the second horizontal direction, namely, the Y-direction perpendicular to the X-direction to engage the cam M of the slider A with the engageable portion of the slider C and move the slider C in the Z-direction perpendicular to the Y-direction against the biasing force of the second spring, and thereby sliding the second contactor in the Z-direction on an associated second fixed contact pattern on the switch board.

In both the on-off operations as the slide switch and the push switch, the first and second contactors function to carry out self-cleaning of the associated fixed contact patterns to thereby prevent the contact fault.

As the switch assembly of the present invention is constructed by combining the single switch board and the three sliders A, B and C, the structure is simplified.

Further, since there is defined a small gap between the cam M of the slider A and the engageable portion of the slider C under the inoperative condition of the operating knob, the slider A can be smoothly moved in the X-direction without the engagement of the cam M with the enagageable portion of the slider C, thereby improving the operation feeling in the sliding operation of the operating knob.

Other objects and features of the invention will be more fully understood from the following detailed description and appended claims when taken with the accompanying drawings.

BRIEF DESCRIPTION

DETAILED DESCRIPTION OF THE PREFERRED EMBODIMENT

Figure 1:
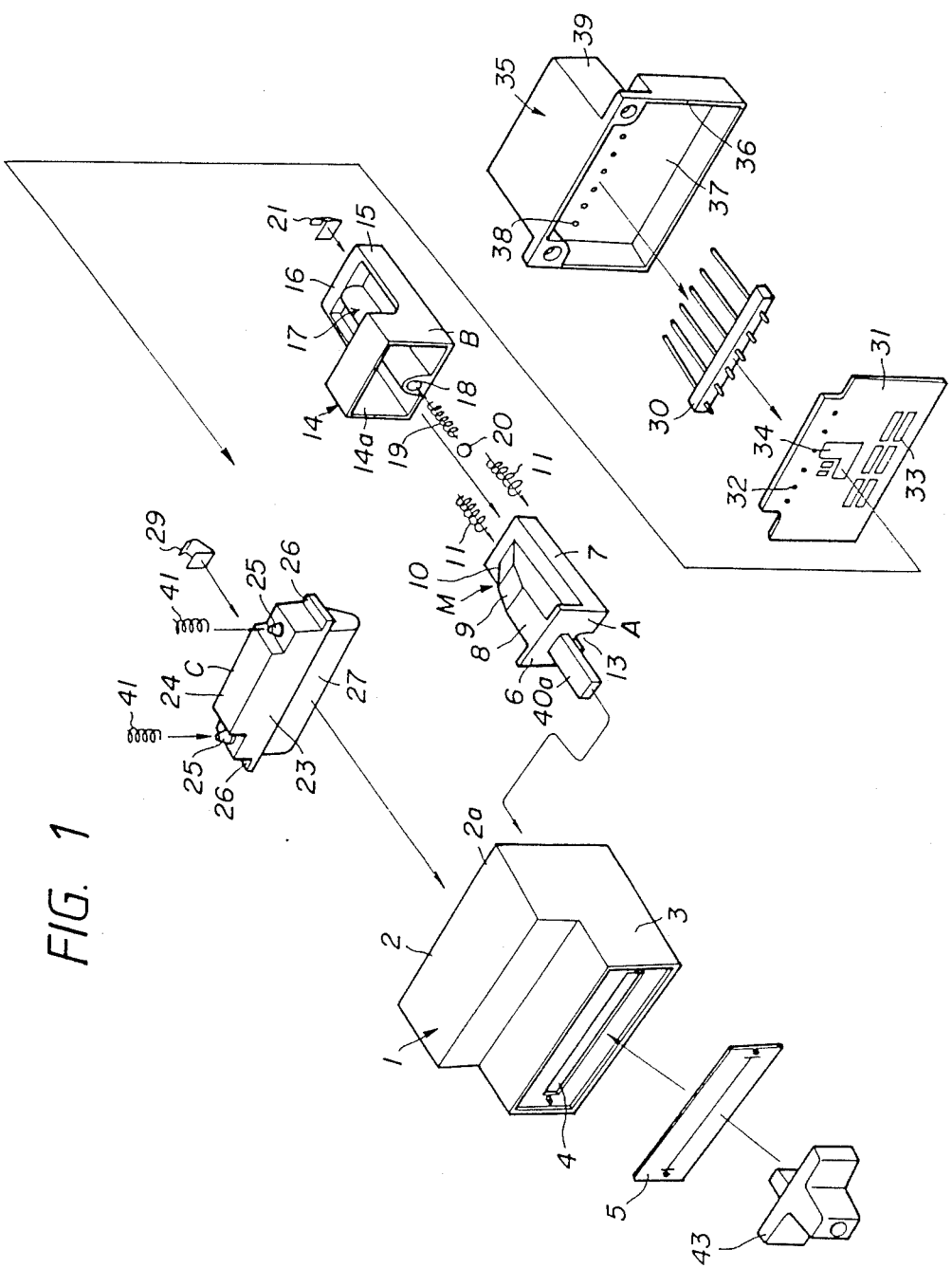
FIG. 1 is an exploded perspective view of the switch assembly according to the present invention.

There will now be described a preferred embodiment of the present invention with reference to the accompanying drawings.

Referring to FIGS. 1 to 4, reference numeral 1 designates a case formed of an insulating material. The case 1 is generally constituted of an upper case portion 2 and a lower case portion 3 which are integrally formed with each other. The lower case portion 3 projects frontwardly from the upper case portion 2. The lower case portion 3 has formed at its front surface a horizontally elongated aperture 4 through which a front end of a slider A is to be inserted as will be hereinafter described. A dust cover 5 formed of rubber is attached to the front surface of the lower case portion 3 to cover the aperture 4. The dust cover 5 is formed with a slit corresponding to the aperture 4.

The slider A is generally consituted of a front vertical portion 6 and a horizontal portion 7 perpendicular to the front vertical portion 6 and extending rearwardly therefrom. The horizontal portion 7 has formed at a central position on its upper surface a thick-walled portion 8 extending rearwardly from the front vertical portion 6 to a position near a rear end of the horizontal portion 7. The thick-walled portion 8 has formed at its rear end portion a cam M formed by two continuous inclined surfaces 9 and 10 having different inclined angles.

Figure 2:
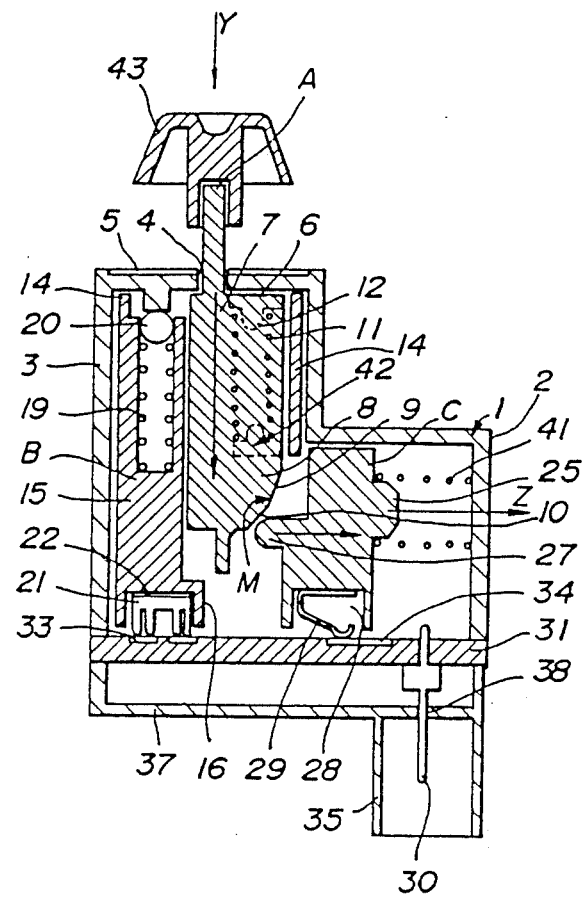
FIG. 2 is a longitudinally vertical sectional view of the switch assembly shown in FIG. 1.

A slider B has an L-shaped configuration as viewed in side elevation such that it is generally constituted of a first vertical box-shaped portion 14 opened at its front side and a second horizontal box-shaped portion 15 extending rearwardly from the first box-shaped portion 14. The second box-shaped portion 15 has an open top 16 with a rear end. A sectionally semi-circular elongated projection 17 is formed on a bottom inside surface of the first and second box-shaped portions 14 and 15. As shown in FIG. 1, the elongated projection 17 is formed therein with a longitudinal hole 18 for inserting thereinto a coil spring 19 and a detent ball 20 to be biased by the coil spring 19. FIG. 2 shows that the second box-shaped portion 14 has formed at its rear end a recess 22 for receiving a first contactor 21.

A slider C is generally constituted of a base 23, a rectangular prism 24 formed on an upper surface of the base 23 and a sectionally arcuate elongated projection 26 formed on a lower surface of the base 23 in such a manner as to extend longitudinally of the base 23. The base 23 has formed at its upper surface a pair of projections 25 for retaining a pair of springs 41 at opposite positions of the rectangular prism 24. The base 23 has further formed at its lower opposite ends a pair of flanges 26. As shown in FIG. 2, the base 23 has formed at its rear surface a recess 28 for receiving a second contactor 29.

Reference numeral 30 designates a connector having a plurality of connecting rods, and reference numeral 31 designates a printed circuit board formed with a plurality of holes 32 for inserting thereinto the front end portions of the connecting rods of the connector 30. The connecting rods of the connector 30 are soldered with the printed circuit board 31 at the holes 32 after insertion. The printed circuit board 31 has formed on its front surface a plurality of first fixed contact patterns 33 for a slide switch and with a second fixed contact pattern 34 for a push switch at a position first fixed contact patterns 33.

Reference numeral 35 designates a rear cover formed of an insulating material. The rear cover 35 is formed at its front end with a flange 36 for mounting thereon the printed circuit board 31. The rear cover 35 has formed at its rear side surface a plurality of holes 38 for inserting thereinto the rear end portions of the connecting rods of the connector 30. The rear end portions of the connecting rods of the connector 30 after insertion are received in a hollow projection 39 projection rearwardly from the rear cover 35.

Figure 3:
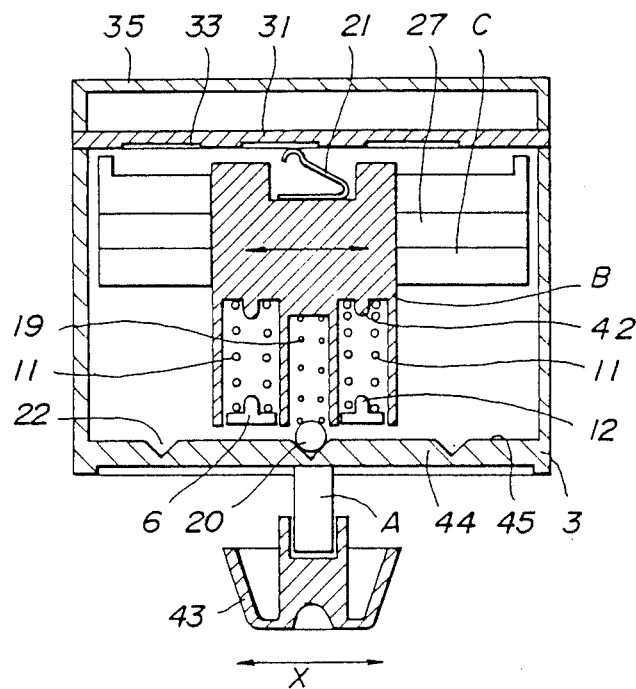
FIG. 3 is a horizontal sectional view of the switch assembly shown in FIG. 1.

The above-mentioned elements of the switch are assembled as follows:

Referring to FIG. 1, a pair of coil springs 11 are located on the upper surfaces of the horizontal portion 7 at the opposite side positions of the thick-walled portion 8 of the slider A. The coil springs 11 are engaged at their front ends with a pair of projections 12 (See FIG. 2) formed on the rear surface of the vertical portion 6 of the slider A. Under this condition, the slider A is inserted from a frontal opening 14a of the first box-shaped portion 14 of the slider B. At this time, the rear ends of the coil springs 11 engage a pair of projections 42 formed on the rear inside surface of the first box-shaped portion 14 (See FIG. 2), and a longitudinal groove 13 formed on the lower surface of the slider A is guided to engage the longitudinal projection 17 of the slider B. Upon full insertion of the slider A into the slider B, the cam M of the slider A is exposed from the upper opening of the second box-shaped portion 15. The assembly of the slider A and the slider B thus obtained is inserted into the lower case portion 3 ofthe case 1, and a front projection 40a of the slider A is inserted through the aperture 4 of the lower case portion 3 and the slit of the dust cover 5 to the outside of the case 1. Then, an operating knob 43 is fixed to the end of the front projection 40a. Under this condition, the detent ball 20 is biased by the coil spring 19 to resiliently contact a cam surface 44 formed on the front inside surface of the lower case portion 3 as shown in FIGS. 2 and 3.

Figure 4:
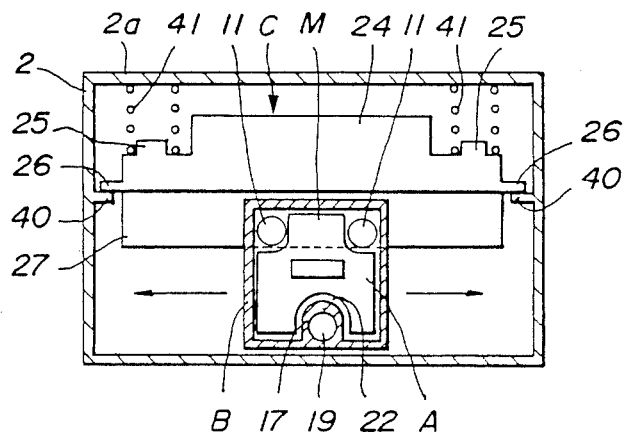
FIG. 4 is a laterally vertical sectional view of the switch assembly shown in FIG. 1.

Then, the slider C is inserted into the upper case portion 2 of the case 1 in such a manner that the flanges 26 of the slider C are supported on a pair of internal flanges 40 formed on the opposite side surfaces of the case 1 as shown in FIG. 4. Under this condition, the upper ends of the coil springs 41 retained at their lower ends to the projections 25 abuts against an upper wall 2a of the upper case portion 2 to thereby make the flanges 26 resiliently abut against the internal flanges 40. As shown in FIG. 2, there is defined a small gap between the projection 27 of the slider C and the cam M of the slider A under this condition.

In the next step, the printed circuit board 31 including the connector 30 is so mounted as to close the rear opening of the case 1, and then the rear cover 35 is connected through the printed circuit board 31 to the case 1 with the connecting rods of the connector 30 inserted through the holes 38 of the rear cover 35.

The operation of the switch assembly of the present invention will now be described.

Referring to FIG. 3, when the operating knob 43 is moved in the direction of arrow X, the slider A is also moved in the same direction together with the slider B. Accordingly, the first contactor 21 is slid in the X-direction on the first fixed contact patterns 33 on the printed circuit board 31 to thereby effect on-off operation of the switch as a slide switch. In this operation, the detent ball 20 biased by the coil spring 19 is also slid on the cam surface 44 of the lower case portion 3. During the sliding motion of the detent ball 20, it comes into engagement with any one of recesses 22 formed on the cam surface 44, so that an operator may feel a click.

On the other hand, when the operating knob 43 is pushed in the direction of arrow Y against the biasing force of the coil springs 11 as shown in FIG. 2, the cam M of the slider A is moved in the Y-direction to contact the projection 27 of the slider C and move the slider C in the direction of arrow Z perpendicular to the Y-direction against the biasing force of the coil springs 41. Accordingly, the second contactor 29 is slid in the Z-direction on the second fixed contact pattern 34 on the printed circuit board 31 to thereby effect on-off operation of he switch as a push switch. In the pushing operation as mentioned above, when the cam M comes into engagement with the projection 27, the operator can feel a click since the inclined surfaces 9 and 10 of the cam M have the different inclined angles.

As mentioned above, the on-off opoeration of the switch as the slide switch is effected by moving the operating knob 43 in the first horizontal direction, namely, the X-direction and thereby sliding the first contactor 21 on the first fixed contact patterns 33 on the printed circuit board 31. In this operation, the first contactor 21 also functions to carry out self-cleaning. On the other hand, the on-off operation of the switch as the push switch is effected by pushing the operating knob 43 from a desired horizontal position in the second horizontal direction, namely, the Y-direction and thereby sliding the second contactor 29 on the second fixed contact pattern 34 on the printed circuit board 31. In this operation, the second contactor 29 also functions to carry out self-cleaning.

Accordingly, even when a dust or the like is deposited on the fixed contact patterns 33 and 34 on the printed circuit board 31, it is cleaned off by the self-cleaning function of the first and second contactors 21 and 29, thereby preventing contact fault and increasing a life of the switch.

Further, since there is defined a small gap between the cam M of the slider A and the projection 27 of the slider C under the inoperative condition of the operating knob 43, the slider A can be smoothly moved in the X-direction without the engagement of the cam M with the projection 27 of the slider C, thereby improving an operation feeling in the sliding operation of the operating knob 43.

Furthermore, since the switch assembly of the present invention is constructed by merely combining the three sliders A, B and C, the structure of the switch is simplified.

Although the slider A is loosely fitted into the slider B in the above preferred embodiment, the slider B may be loosely fitted into the slider A.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A combined push and slide switch assembly comprising:
    a case having a front end and a rear end, said rear end having fixed first and second patterns contact;
    a first slider provided in said case and slidable in a first direction and a second direction within said case, said first slider having a cam at a rear and portion thereof;
    an operating knob fixed to a front end of said first slider projectig outside said case;
    a second slider provided in said case and loosely fitted to said first slider in such a manner as to permit the sliding movement of only said first slider in said second direction, and permitting said second slider to be moved together with said first slider in said first direction;
    a first contactor provided in said second slider for effecting an operation of a slide switch;
    a first resilient member interposed between said first slider and said second slider to bias said first slider toward said front end of said case;
    a third slider provided in said case and moveable in a third direction different from both said first direction and said second direction, said third slider having an engageable portion engageable with said cam of said first slider;
    a second contactor provided in said third slider for effecting an operation of a push switch; and
    a second resilient member interposed between said third slider and said case for biasing said engageable portion of said third slider against said cam;
    wherein when said operating knob is moved in said first direction to slide said first slider in the first direction, said second slider is slidable together with said first slider to slide said first contactor to said engage first fixed contact patterns on said rear end of said case, thereby effecting the operation of said slide switch; further, when said operating knob is pushed against a biasing force of said first resilient member to move said first slider in said second direction, said cam of said first slider is brought into engagement with said engageable portion of said third slider against a biasing force of said second resilient member to move said third slider in said third direction and thereby sliding said second contactor in the third direction to engage said second fixed contact pattern of said rear end of said case, thereby effecting the operation of said push switch.

2. A combined push and slide switch assembly according to claim 1, wherein said first direction is perpendicular to said second direction.

3. A combined push and slide switch assembly according to claim 2, wherein said third direction is perpendicular to both said first and said second directions.

4. A combined push and slide switch assembly according to claim 1, wherein said rear end of said case further comprises a printed circuit board for mounting said first and second fixed contact patterns.

* * * * *

UNITED STATES PATENT AND TRADEMARK OFFICE
CERTIFICATE OF CORRECTION

PATENT NO.  : 4,871,885

DATED       : October 3, 1989

INVENTOR(S) : Soetsu Kamada

It is certified that error appears in the above-identified patent and that said Letters Patent is hereby corrected as shown below:

Claim 1

Col. 6 Line 7, "patterns contact" should read --contact patterns--

Col. 6 Line 13, "projectig" should read --projecting--

Col. 6 Line 39 "said engage" should read --engage said--

Signed and Sealed this

Nineteenth Day of February, 1991

Attest:

HARRY F. MANBECK, JR.

Attesting Officer        Commissioner of Patents and Trademarks